UNITED STATES PATENT OFFICE.

ANTON MESSERSCHMITT, OF STOLBERG, GERMANY.

METHOD FOR EXTRACTING ALKALI METALS IN THE FORM OF NITRATES FROM MINERALS.

1,076,508.      Specification of Letters Patent.     Patented Oct. 21, 1913.

No Drawing.     Application filed March 1, 1912. Serial No. 680,988.

*To all whom it may concern:*

Be it known that I, ANTON MESSERSCHMITT, a subject of the German Emperor, residing in the city of Stolberg, Rhine Province, Germany, have invented new and useful Improvements in Methods for Extracting Alkali Metals in Form of Nitrates from Minerals, of which the following is a specification.

This invention relates to a method for extracting alkali-metals in form of nitrates from minerals.

An object of the invention is to extract directly and without any intermediary steps the alkali-metals from minerals which contain alkali-metals.

Another object of the invention is to obtain as a result of this extraction an end product of higher value than it was possible in known methods.

Another object of the invention is to extract alkali-metals from minerals by using materials which are on the market in large quantities and which are therefore not expensive.

With these and other objects in view I have described in the following specification by way of example one mode of performing the method set forth.

It has been observed that minerals of volcanic origin containing alkali-metals, like phonolites and other minerals of similar characteristics may be used for the production of nitrates by heating said minerals for an extended period in an aqueous solution of calcium-nitrates, magnesium-nitrates and such like.

The calcium-nitrate of ordinary purity usually contains some calcium-hydroxid, and this latter ingredient exerts a favorable influence upon the reaction. When the temperature is increased to the boiling point of water only, the reaction takes place very slowly; it will be accelerated, however, when the material is subjected to higher temperatures and pressure. For this purpose a paste consisting of a mixture of the mineral to be treated, the calcium-nitrate and water is introduced into an autoclave, and is maintained in continuous motion. The pressure in the autoclave may vary from fifty to one hundred and twenty five pounds per square inch, and the heating may be continued for from ten to twenty hours. The materials may preferably be mixed in the following proportions: 1000 pounds of the mineral, like phonolite, 600 pounds basic calcium-nitrate and 1000 pounds (120 gallons) of water. It is advisable to add about 200 pounds of lime. The slime obtained by this method is lixiviated in water and the result is a solution of alkali-nitrates in almost chemically pure condition. The solution may still contain some calcium-nitrate; this excessive amount may be precipitated by adding an alkali-carbonate or a hydroxid. The solution may, after the precipitation, be neutralized by means of nitric acid, and may be evaporated. If the above method is performed with the amount of phonolite stated, about 180 pounds nitrate of potassium and 220 pounds nitrate of sodium will be produced.

In known methods for producing alkali-metal compounds from minerals, by heating the minerals with lime, the products obtained consisted of mixtures of alkali-metal compounds and the ingredients of the mixtures could only be separated with difficulty. In the present method, however, the nitrates finally produced are in almost chemically pure state.

I claim:

1. A method for extracting alkali-metals in the form of nitrates from minerals, which comprises pulverizing the minerals which contain alkali-metals and boiling the pulverized minerals in an aqueous solution containing calcium nitrate.

2. A method for extracting alkali-metals in the form of nitrates from minerals, which comprises boiling the minerals which contain alkali-metals in an alkaline solution of calcium nitrate with the addition of caustic lime.

3. A method for extracting alkali-metals in the form of nitrates from minerals, which comprises pulverizing the minerals which contain alkali-metals and boiling the pulverized minerals under pressure in an aqueous solution containing basic calcium nitrate.

4. A method for extracting alkali-metals in the form of nitrates from minerals, which comprises boiling under pressure the minerals which contain alkali-metals in an alkaline solution of calcium nitrate with the addition of caustic lime.

5. A method for extracting alkali-metals in the form of nitrates from minerals, which comprises boiling under pressure the minerals which contain alkali-metals in a solution of basic calcium nitrate with the addition of caustic lime.

6. A method for extracting alkali-metals in the form of nitrates from minerals, which comprises boiling the minerals which contain alkali-metals in a solution of basic calcium nitrate and precipitating excessive calcium nitrate from the product obtained.

7. A method for extracting alkali-metals in the form of nitrates from minerals, which comprises boiling the minerals which contain alkali-metals in an alkaline solution of a nitrate, precipitating excessive amounts of the added nitrate from the solution obtained, neutralizing the solution with nitric acid, and evaporating the solution.

8. A method for extracting alkali-metals in the form of nitrates from minerals, which comprises boiling under pressure minerals which contain alkali-metals in a solution of a basic nitrate, precipitating excessive amounts of the added nitrate from the solution obtained, neutralizing the solution with nitric acid, and evaporating the solution.

9. A method for extracting alkali-metals in the form of nitrates from minerals, which comprises boiling under pressure minerals which contain alkali-metals in a solution of a basic nitrate with the addition of caustic lime, precipitating excessive amounts of the added nitrate from the solution obtained, neutralizing the solution with nitric acid, and evaporating the solution.

In testimony whereof I affix my signature in presence of two witnesses.

ANTON MESSERSCHMITT.

Witnesses:
HENRY ARADPÜEY,
ELISE KOCLBURSH.